(12) United States Patent
Stebor

(10) Patent No.: US 11,025,804 B2
(45) Date of Patent: Jun. 1, 2021

(54) MODULAR WEDGES FOR GENERATING PANORAMIC VIDEO

(71) Applicant: Intel Corporation, Santa Clara, CA (US)

(72) Inventor: Nathan Stebor, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/455,108

(22) Filed: Jun. 27, 2019

(65) Prior Publication Data

US 2019/0327395 A1 Oct. 24, 2019

(51) Int. Cl.
*H04N 5/225* (2006.01)
*H04N 5/232* (2006.01)

(52) U.S. Cl.
CPC ......... *H04N 5/2253* (2013.01); *H04N 5/2254* (2013.01); *H04N 5/2258* (2013.01); *H04N 5/23238* (2013.01)

(58) Field of Classification Search
CPC .. H04N 5/2253; H04N 5/2254; H04N 5/2258; H04N 5/23238
See application file for complete search history.

(56) References Cited

U.S. PATENT DOCUMENTS

| | | | | |
|---|---|---|---|---|
| 10,275,898 B1 * | 4/2019 | Song | ...................... | G06T 7/593 |
| 2002/0113862 A1 * | 8/2002 | Center, Jr. | ............. | H04N 19/23 |
| | | | | 348/14.08 |
| 2006/0216018 A1 * | 9/2006 | Chang | ..................... | G03B 17/02 |
| | | | | 396/351 |
| 2010/0097443 A1 * | 4/2010 | Lablans | ............... | H04N 5/3415 |
| | | | | 348/36 |
| 2011/0170849 A1 * | 7/2011 | Chang | ..................... | G03B 19/07 |
| | | | | 396/322 |
| 2013/0141526 A1 * | 6/2013 | Banta | ............... | H04N 21/21805 |
| | | | | 348/38 |
| 2013/0265394 A1 * | 10/2013 | Lim | ..................... | H04N 5/2253 |
| | | | | 348/46 |
| 2014/0055623 A1 * | 2/2014 | Okada | ................ | H04N 5/23293 |
| | | | | 348/177 |
| 2015/0301313 A1 * | 10/2015 | Lipton | ............... | G02B 13/0015 |
| | | | | 348/46 |
| 2015/0367958 A1 * | 12/2015 | Lapstun | ............... | G03B 15/006 |
| | | | | 348/144 |
| 2016/0323560 A1 * | 11/2016 | Jin | ..................... | H04N 5/23267 |
| 2017/0251208 A1 * | 8/2017 | Adsumilli | ............ | H04N 19/124 |
| 2018/0089903 A1 * | 3/2018 | Pang | ..................... | H04N 5/2258 |
| 2019/0158737 A1 * | 5/2019 | Hsu | ..................... | H04N 13/243 |
| 2019/0158813 A1 * | 5/2019 | Rowell | ................ | H04N 9/8205 |
| 2019/0297238 A1 * | 9/2019 | Klosterman | ......... | H04N 5/2258 |

* cited by examiner

*Primary Examiner* — Thai Q Tran
*Assistant Examiner* — Sunghyoun Park
(74) *Attorney, Agent, or Firm* — Hanley, Flight &, Zimmerman, LLC

(57) ABSTRACT

An example apparatus for generating panoramic video includes a number of modular wedges. Each of the modular wedges also includes two high resolution imaging sensors. Each of the modular wedges further includes two discrete lenses coupled to one side of the modular wedge. Each of the modular wedges also further includes two transceivers coupled to the imaging sensors to output video data.

25 Claims, 10 Drawing Sheets

100

400

MODULAR WEDGES FOR GENERATING PANORAMIC VIDEO

BACKGROUND

Stereoscopic cameras may be used to capture pairs of images that may then be displayed via a three dimensional display device. For example, the three dimensional display device may be a virtual reality display, such as a head mounted display (HMD).

BRIEF DESCRIPTION OF THE DRAWINGS

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

Figure 1:
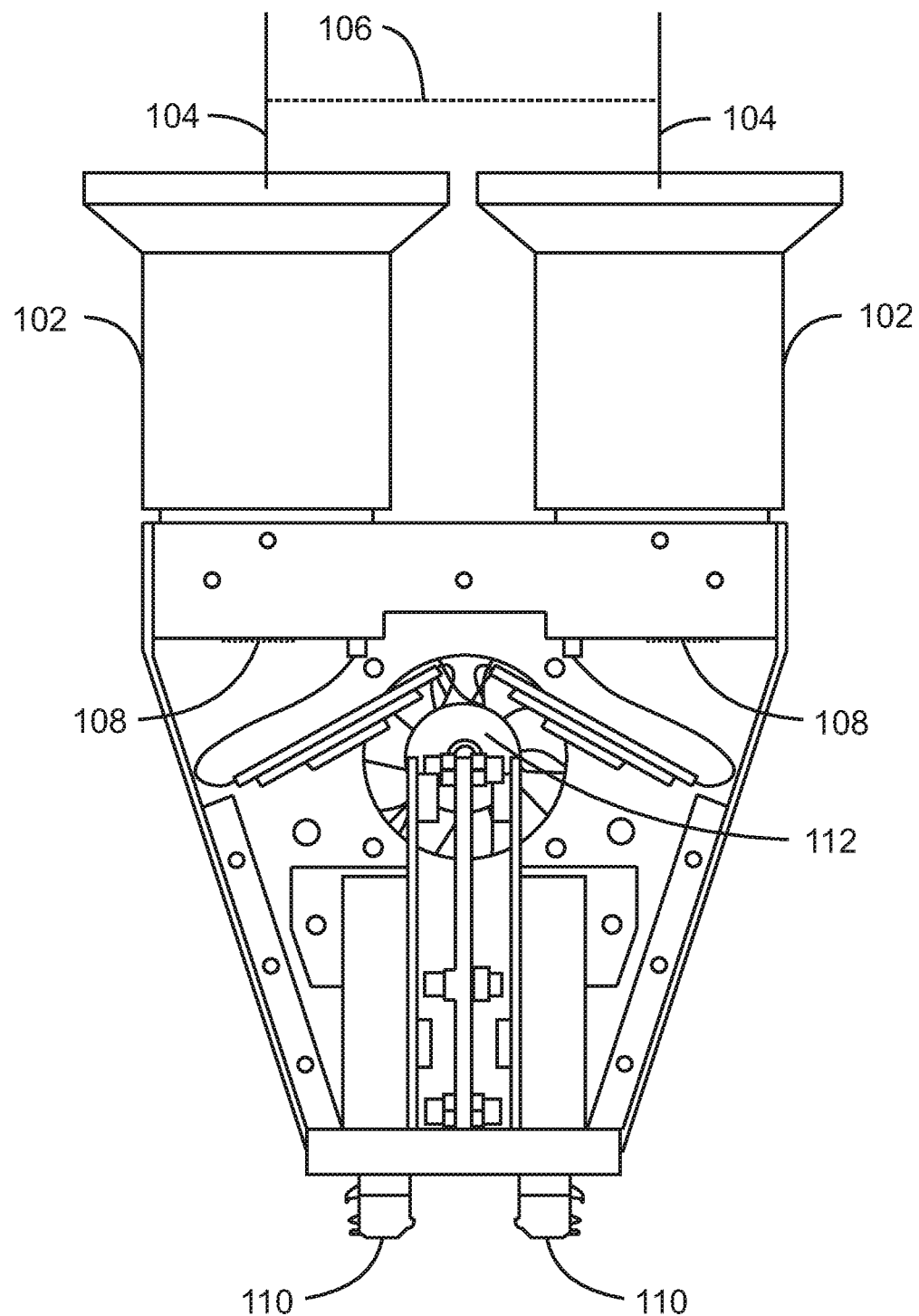
FIG. 1 is a block diagram illustrating an example modular wedge.

Virtual Reality (VR) cameras used for live events such as sports or concerts produce high quality content suitable for a broadcast on high-definition TV, head worn devices or mobile streaming applications. These cameras may have high quality image sensors and imaging optics pointed outwards within an event to provide an experience of being inside the event. These imaging optics may be large, heavy and expensive. However, VR may benefit from having the cameras to be as close to action as possible to provide users with an immersive experience. The use of large cameras may be a safety hazard for any players or nearby spectators. Larger cameras may also be too heavy to allow an operator to get close to the action and relocate as needed. Furthermore, larger cameras may obstruct or distract both viewers at the event or viewers watching over standard broadcasts. In addition, different events may have different constraints in terms of camera placement, distance to action, lighting, etc. While a single VR camera design may work well in one environment, such a single camera design may be a poor solution in another environment.

In some examples, a volumetric system of cameras may be placed around and pointed inward towards an event to render objects in three dimensions. For example, objects in the event may be captured from a variety of angles and rendered into three dimensional objects. A challenge facing such a volumetric system is the tradeoff between capturing video over a wide enough area that the entire field is covered while also capturing images with enough pixel resolution to render objects with acceptable fidelity. For example, the individual objects may be players in sports games. Forcing the individual cameras to capture very wide fields of view, the resolution of individual features within the image is poor, and so the fidelity of the rendered object is also poor, even when using cameras that have high pixel counts. Furthermore, using cameras with the very highest pixel counts presents a data challenge because most cameras may not be equipped to transport high resolution frames at the standard video rate of 30 frames per second. This can significantly degrade experiences meant to put viewers close to the action in an immersive environment. Moreover, custom solutions end up wasting many of the pixels outside the region of interest. For example, because the players and action in many sports tend to be localized, individual objects make up a small part of the captured image and most of the data may not actually be used in the rendering that goes into the final product. This inefficiency may create data throughput problems with camera systems that involve upwards of three dozen cameras.

The present disclosure relates generally to techniques for capturing panoramic images via a compact camera design that features pairs or arrays of machine vision cameras assembled into modular wedges. Specifically, the techniques described herein include an apparatus, method and system for generating panoramic video. An example apparatus includes a number of modular wedges. Each of the modular wedges also includes two high resolution imaging sensors. Each of the modular wedges further includes two discrete lenses coupled to one side of the modular wedge. Each of the modular wedges also further includes two transceivers coupled to the imaging sensors to output video data. In various examples, techniques include an array of two or more cameras that uses mixed focal lengths and tiled images to provide both wide field of view and high pixel density in the middle of the frame. In some examples, the techniques may also be used in volumetric systems for generating three dimensional objects.

The techniques described herein thus enable a stereoscopic panoramic image capture solution that is compact. Pairs of lenses in each of the modular wedges allow stereoscopic video capture, providing a sense of immersion while content is consumed in a VR headset. Each of the modular wedges may be designed to accommodate larger imaging sensors and high quality imaging optics, such that output video is of significantly higher quality than other standard VR capture units. In addition, the techniques enable the modular wedges to be reconfigured within a housing to allow for different physical sizes, different fields of view, etc. An interchangeability of the lenses within each of the modular wedges also allows the user to not only optimize the captured field of view for a particular event, but to easily modify the system to broadcast events with very different constraints. The flexibility and compactness of the modular design allows for a single modular wedge to be used as the building block for systems with varying designs to be deployed at different events. For example, a design for a basketball game may differ from a design for a football game, or other event. The use of an array of cameras that uses mixed focal lengths and tiled images to provide both wide field of view and high pixel density in the middle of the frame enhances the resolution of target objects. As one examples, a typical volumetric camera installation at a soccer or American football stadium may be far enough away from the field that individual players are approximately 150 pixels high, even when using 5K cameras. Increasing this number up to 300 or even 600 pixels greatly improves the quality of the resulting video experience. Adding cameras with longer focal length lenses allows the user to zoom into a region of interest in a panorama and not lose any quality.

In addition, when used in volumetric systems, the techniques can be used to improve the quality of generated three dimensional objects while maintaining the coverage needed for the calibration pipeline. For example, foveated video can be used to generate three dimensional objects with more details and accuracy by providing more pixels for rendering the three dimensional objects.

FIG. 1 is a block diagram illustrating an example modular camera wedge. The example modular wedge 100 can be implemented in the system 200 of FIG. 2, the computing device 700 in FIG. 7 using the method 500 of FIG. 5.

The example modular wedge 100 includes a pair of lenses 102 having centers 104 separated by a predetermined distance 106. For example, the distance between the centers of the lenses 102 may be approximately 60 millimeters. In various examples, the two lenses 102 are coupled to one side of the modular wedge 100. The modular wedge 100 also includes a pair of sensors 108 to capture a pair of stereoscopic images. For example, the sensors 108 may be high resolution imaging sensors. The modular wedge 100 also further includes a pair of transmitters 110 to transmit the stereoscopic video from the sensors 108. The modular wedge 100 also further includes a fan 112 to displace heated air out from the inside of the modular wedge 100.

As shown in FIG. 1, the modular wedges 100 may be used to capture stereoscopic images in a given direction. In some examples, the lenses 102 may be replaceable with other lenses. For example, lenses 102 having different focal lengths, apertures, or any other characteristics may be used in the modular wedge 100.

In various examples, the sensors 108 may capture focused light from the lenses 102. For example, the sensors 108 may capture the light at a high resolution, such as 1080p, 4k, or 8k. The sensors 108 may then send the captured light information in the form of a stereoscopic video to a circuit (not shown) for processing via the connectors 110. For example, the stereoscopic video may be a pair of videos having varying horizontal disparities of objects captured therein. In various examples, the transmitters 110 may be small form-factor pluggable (SFP+) transceivers mounted on the back side of each of the modular wedges 100.

The modular wedge 100 includes a fan 112 to displace heat from the inside of the modular wedge 100. In some examples, the fan 112 may be controlled by a fan controller. For example, the fan controller may control the speed of the fan based on temperature inside the modular wedge 100.

The diagram of FIG. 1 is not intended to indicate that the example modular wedge 100 is to include all of the components shown in FIG. 1. Rather, the example modular wedge 100 can be implemented using fewer or additional components not illustrated in FIG. 1 (e.g., additional fans, sensors, transmitters, lenses, heat transfer mechanisms, etc.).

Figure 2:
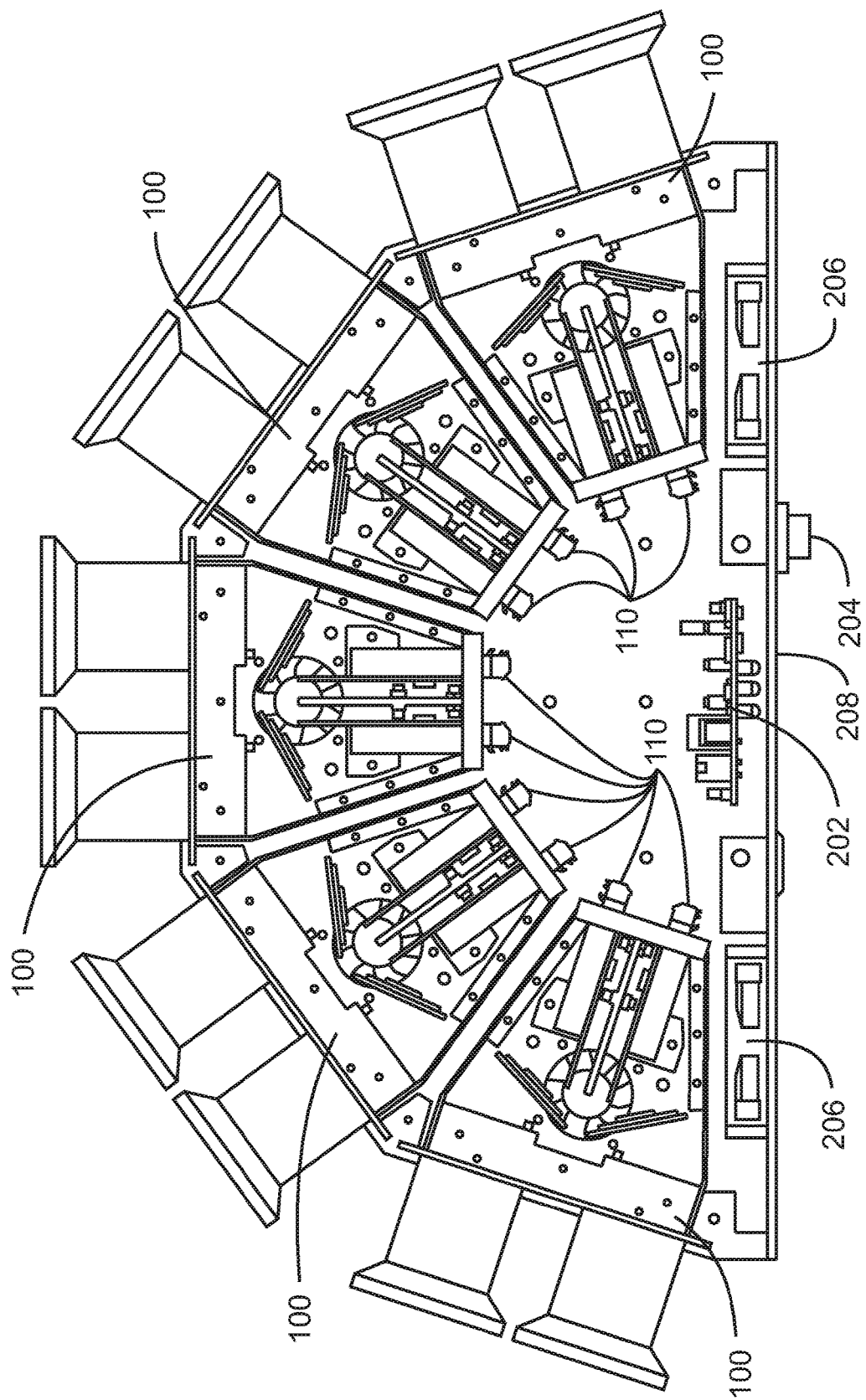
FIG. 2 is a block diagram illustrating an example system of modular wedges for generating panoramic video.

FIG. 2 is a block diagram illustrating an example system of modular wedges for generating panoramic video. The system 200 can be implemented using the modular wedge 100 of FIG. 1, in the computing device 700 in FIG. 7, using the method 600 of FIG. 6.

The example system 200 includes a set of five modular wedges 100. The system 200 also includes a circuit 202 to receive stereoscopic images from each of the modular wedges 100 and generate a panoramic image based on the received stereoscopic images. The system 200 further includes a transmitter 204. For example, the transmitter 204 may be a high bandwidth transmitter. As one example, the transmitter 204 may be able to transmit at least 60 frames per second. The system 200 further includes a pair of fans 206. The fans 206 may be used to remove heated air from the system 200. For example, the heat to be removed by the fans 206 may be generated by the modular wedge 100 or the circuit 202. The circuit 202, fans 206 and modular wedge 100 are included inside a housing 208. The transmitter 204 is located on the outside of the housing 208. Each of the modular wedges 100 is electrically coupled to the circuit 202 via a pair of connectors 110.

As shown in FIG. 2, the system 200 may be used to generate panoramic video from captured stereoscopic images in multiple directions. In the example of FIG. 2, five modular wedges 100 are included inside the housing 208. The panoramic field of view depends both on the focal length of the lens and the number of modular wedges 100. For example, if the modular wedges 100 used fisheye lenses, then the system 200 may only use two modular wedges 100 to cover 360 degrees, though the video would be lower resolution. However, if the modular wedge 100 use 'standard' focal lengths then more modular wedges 100 may be used to cover the same field of view with higher resolution. In the example of FIG. 2, the five modular wedges 100 cover a field of view of greater than 180 degrees. In some examples, less modular wedges may be used to capture video in a particular direction. For example, three modular wedges may be used to provide a smaller and lighter design. Such a design may allow deployment of the system 200 to positions closer to an action being filmed and may provide more flexibility if the system 200 needs to be repositioned. In various examples, more lenses or wider angle lenses may be included in the housing 200 to cover a 360 degree field of view. Designs with greater numbers of modular wedges 100 may enable output of higher resolution panoramic video and may thus improve the quality of a broadcast. In this example, the housing 208 may be circular or decagonal in shape. In various examples, the modular wedges 100 may be used to generate a panoramic video with more than 180 degrees of view. For example, the video captured by each of the modular wedges may be stitched together at the circuit 202. A resulting panoramic video may be transmitted via transmitter 204. For example, the panoramic video may be transmitted at speeds of 25 gigabits per second (Gbps) and may be transmitted at 60 frames per second or more.

In various examples, the fans 206 expel heat from the housing 208. In various examples, a fan controller (not shown) may be used to control the speed of the fans 206. For example, the fan controller may control the speed of the fans 206 based on a detected air temperature inside the housing 208 to reduce noise generated by the fans.

In various examples, the modular wedges 100 are interchangeable. For example, a modular wedge 100 may be quickly replaced in response to detecting a damaged or faulty modular wedge 100. The modular wedge 100 may also be replaced with a modular wedge 100 having different lenses. In some examples, two or more stacks of different lenses may be included in the modular wedges 100. For example, each of the modular wedges 100 may have a stack of two or more pairs of lenses arranged vertically one top of each other to provide an increased vertical field of view.

The diagram of FIG. 2 is not intended to indicate that the example system 200 is to include all of the components shown in FIG. 2. Rather, the example system 200 can be implemented using fewer or additional components not illustrated in FIG. 2 (e.g., additional modular wedges, fans, circuits, transmitters, heat transfer mechanisms, etc.).

Figure 3A:
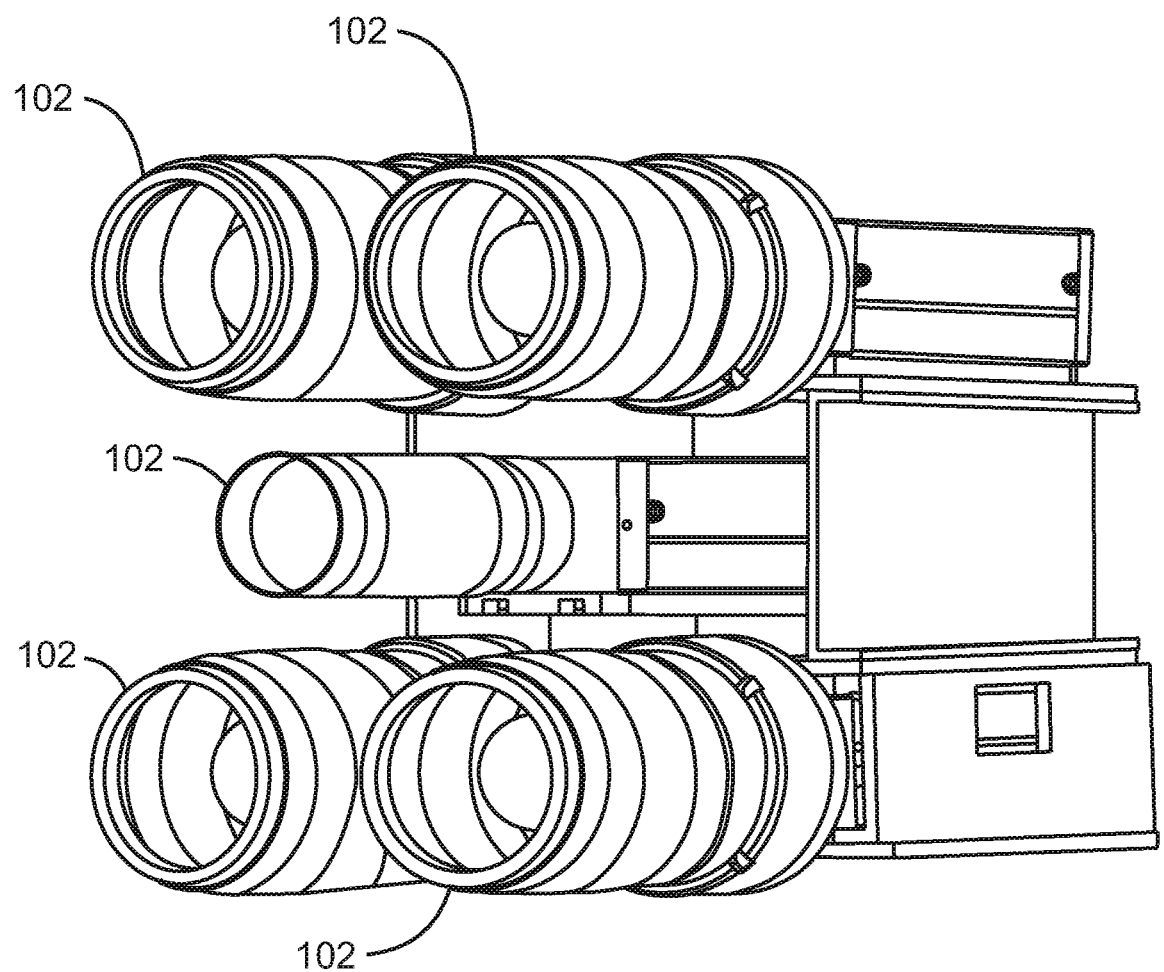
FIG. 3A is a diagram illustrating an example apparatus for foveated video capture.

FIG. 3A is a diagram illustrating an example apparatus for foveated video capture. The example foveated video capture apparatus 300 can be implemented in the system 200 or the modular VR camera 726 of the computing device 700. In some examples, the foveated video capture apparatus 300 can be implemented in a volumetric system that surrounds an event. The foveated video capture apparatus 300 includes similarly numbered elements from FIG. 1.

The foveated video capture apparatus 300 includes an array of lenses including two pairs of lenses 102 and a fifth lens 102 in between the two pairs. In some examples, the array may be five machine vision cameras mounted in a housing as shown in FIG. 3A. In various examples, the five cameras 102 are identical, but the outer four cameras have telephoto lenses 102 mounted thereon so that their individual fields of view are smaller. Thus, the two pairs of cameras may provide much more detail in their captured images. In some examples, the central camera has a very wide angle lens 102 that captures the entire scene with less detail. The wide field of the central camera also provides a large baseline such that different sets of these cameras located around a stadium can be calibrated to common points in space. As one example, the foveated video capture apparatus 300 uses four cameras with telephoto lenses 102, such as 100 mm focal length lenses 102 on the corners. A central camera may have a wide angle lens 102, such as a 12 mm or 16 mm lens 102. In this example, the corner cameras can produce images with approximately 4× the resolution of the wide field camera.

In various examples, the four telephoto lenses 102 on the edges may be angled away from each other so that their images do not overlap much with each other. Thus, a set of image 'tiles' may be formed in the center of the wide field, as shown in the example captured from of FIG. 4.

The diagram of FIG. 3A is not intended to indicate that the example foveated video capture apparatus 300 is to include all of the components shown in FIG. 3A. Rather, the example foveated video capture apparatus 300 can be implemented using fewer or additional components not illustrated in FIG. 3A (e.g., additional lenses, etc.).

Figure 3B:
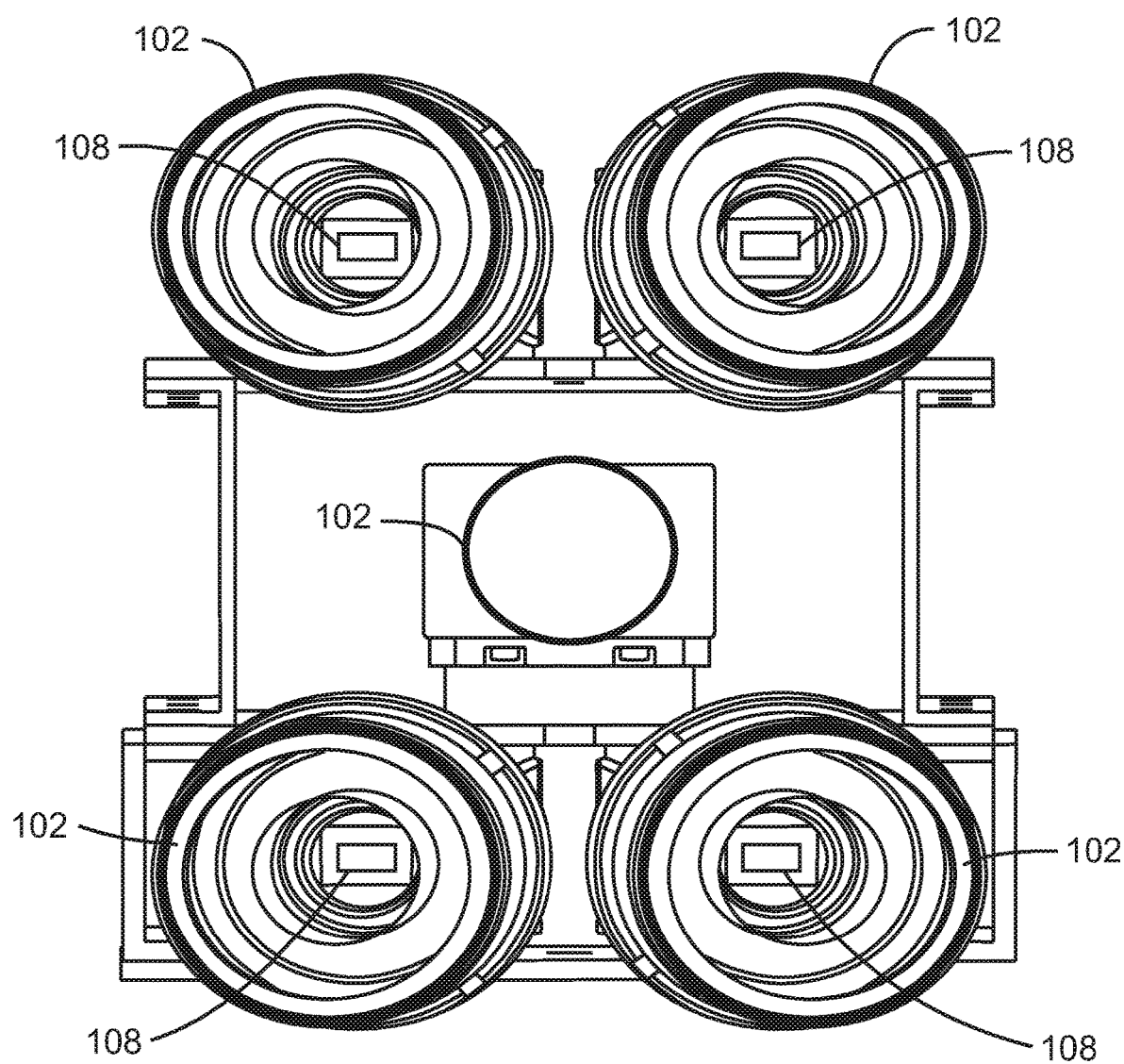
FIG. 3B is a front view diagram illustrating an example apparatus for foveated video capture.

FIG. 3B is a front view diagram illustrating an example apparatus for foveated video capture. The example foveated video capture apparatus 300 can be implemented in the system 200 or the modular VR camera 726 of the computing device 700. In some examples, the foveated video capture apparatus 300 can be implemented in a volumetric system that surrounds an event. The foveated video capture apparatus 300 has similarly numbered elements from FIG. 1.

As shown in FIG. 3B, in various examples, the lens 102 of the center camera is along the boresight direction. The four outer cameras may have lenses 102 that are angled out slightly so that their fields of view do not overlap.

The diagram of FIG. 3B is not intended to indicate that the example foveated video capture apparatus 300 is to include all of the components shown in FIG. 3B. Rather, the example foveated video capture apparatus 300 can be implemented using fewer or additional components not illustrated in FIG. 3B (e.g., additional lenses, sensors, etc.).

Figure 3C:
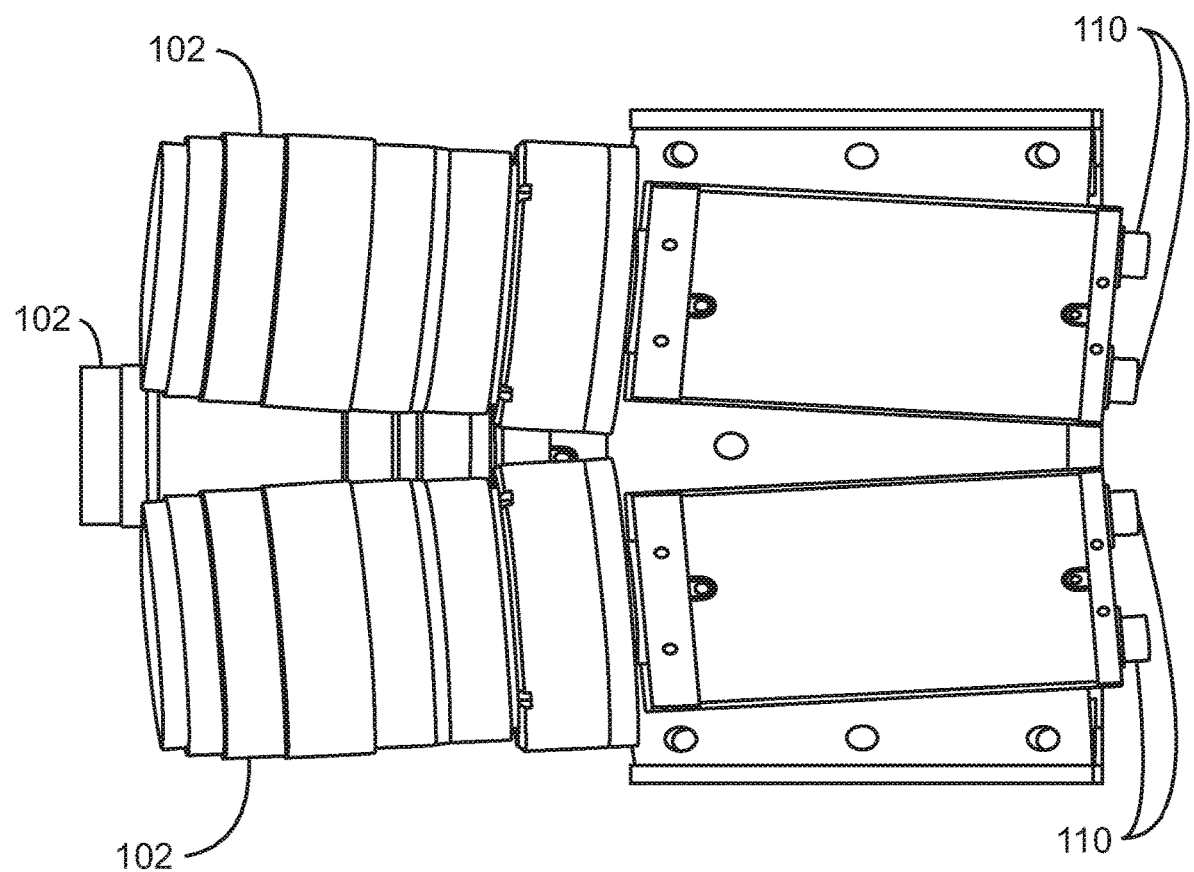
FIG. 3C is a top view diagram illustrating an example apparatus for foveated video capture.

FIG. 3C is a top view diagram illustrating an example apparatus for foveated video capture. The example foveated video capture apparatus 300 can be implemented in the system 200 or the modular VR camera 726 of the computing device 700. In some examples, the foveated video capture apparatus 300 can be implemented in a volumetric system that surrounds an event. The foveated video capture apparatus 300 has similarly numbered elements from FIG. 1.

In the diagram of FIG. 3C, the connectors 110 corresponding to each of the cameras is shown. In various examples, a connector 110 may be provided for each of the cameras. In some examples, a single connector 110 may be provided for the foveated video capture wedge 300. For example, an aggregation circuit may be included to aggregate the data from all of the cameras into one connector. In some examples, a full system installation may place one or more foveated video capture apparatuses 300 at many fixed locations around an event, thus providing a powerful capture system using off-the-shelf parts. In various examples, the foveated video capture apparatus 300 may be included in the example system 200 to provide foveated panoramic video in real time. In some examples, a set of foveated video capture apparatus 300 may be used in a volumetric system to surround an event at different angles and provide foveated video in real time that can be used to generate three dimensional objects with higher quality.

The diagram of FIG. 3C is not intended to indicate that the example foveated video capture apparatus 300 is to include all of the components shown in FIG. 3C. Rather, the example foveated video capture apparatus 300 can be implemented using fewer or additional components not illustrated in FIG. 3C (e.g., additional lenses, sensors, etc.).

Figure 4:
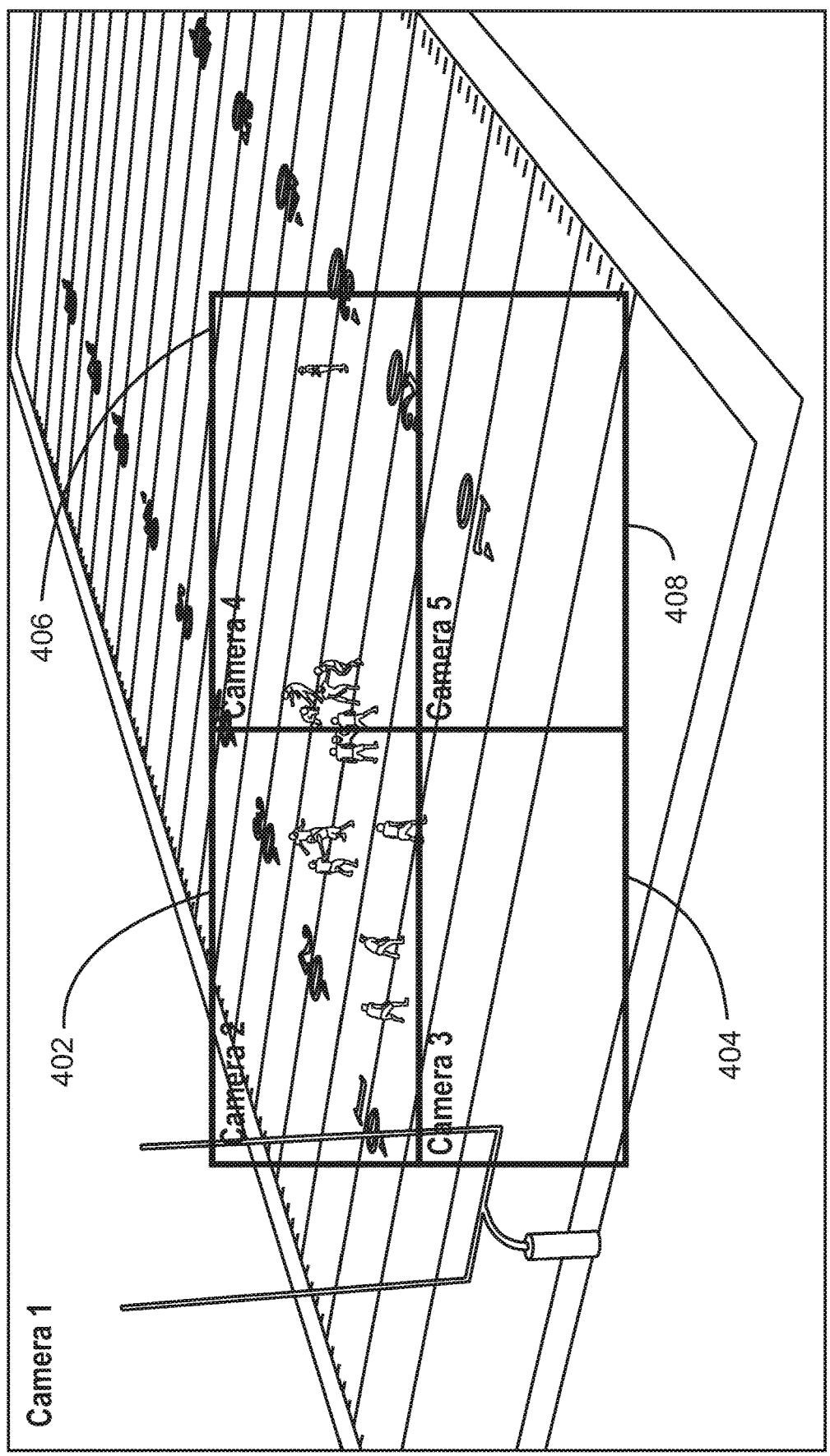
FIG. 4 is an example frame captured using a foveated video capture apparatus.

FIG. 4 is an example frame captured using a foveated video capture apparatus. For example, the frame 400 can be generated using the foveated video capture apparatus 300 of FIGS. 3A-3B.

The example frame 400 includes respective image fields of the cameras of FIGS. 3A-3C. A set of overlay boxes 402, 404, 406, and 408 show relative positions of the images captured by the different cameras in the foveated video capture apparatus. As shown in FIG. 4, the overlay boxes 402, 404, 406, and 408 of cameras 2-5 correspond to the telephoto lenses that achieve much higher optical resolution over a wider field than is possible with any single camera. Camera 1, corresponding to the center camera, may synchronously capture the wide field including the entire frame 400, which allows all camera images to be aligned in space to a common background and to each other. In various examples, a feature detection and matching algorithm can align the high resolution images corresponding to overlay boxes 402, 404, 406, and 408 to the background image. Thus, users watching a live feed of the video can zoom into the high resolution tiles without losing image quality. For example, depending on the location in the background image being zoomed, one or more of the high resolution tiles may be selected and used to provide high resolution video for the cropped portion of the background image that is being zoomed in.

The diagram of FIG. 4 is not intended to indicate that the example frame 400 is to include all of the components shown in FIG. 4. Rather, the example frame 400 can be implemented using fewer or additional components not illustrated in FIG. 4 (e.g., additional image fields, fixed locations, etc.).

Figure 5:
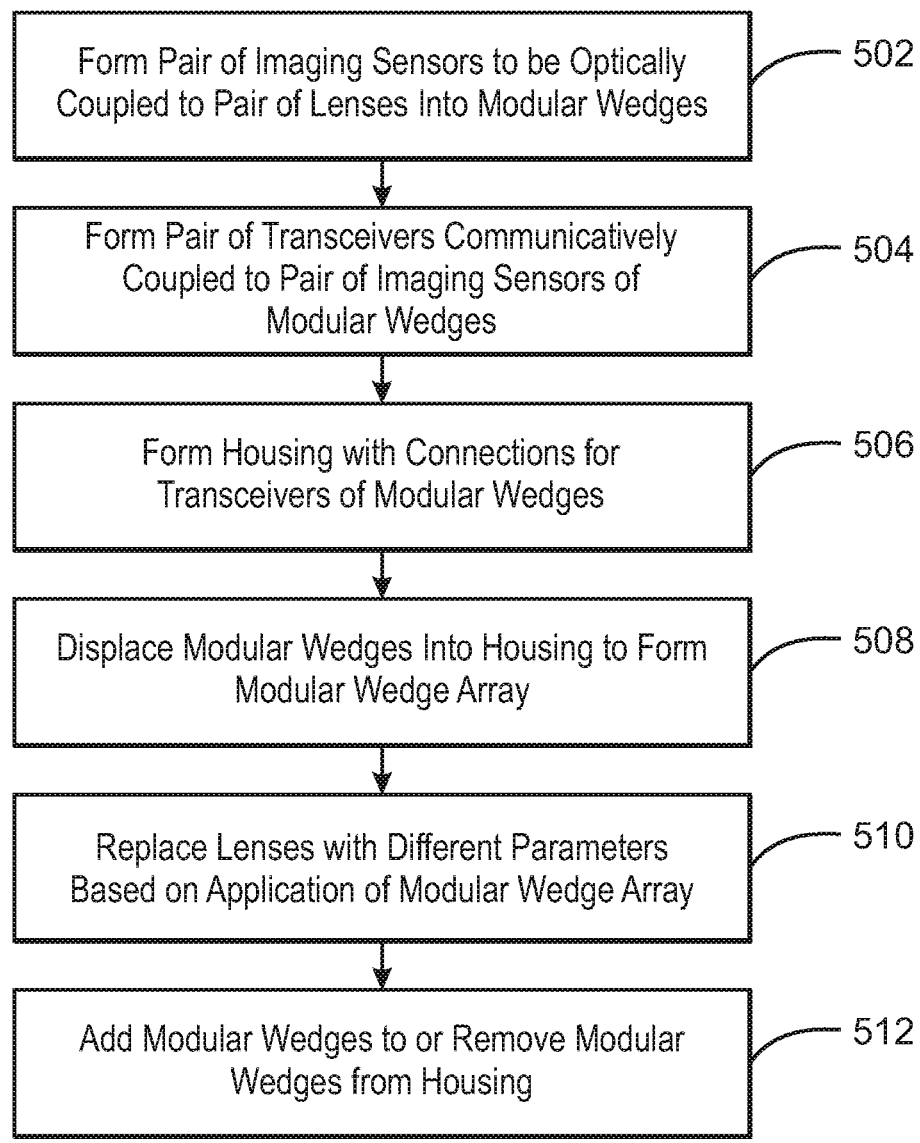
FIG. 5 is a flow chart illustrating a method for forming a system of modular wedges for generating panoramic video.

FIG. 5 is a flow chart illustrating an example method for forming a system of modular wedges for generating panoramic video. The example method 500 can be implemented to form the system 200 or in computing device 700.

At block 502, a pair of imaging sensors to be optically coupled to a pair of lenses are formed in a plurality of modular wedges. For example, the imaging sensors may be spaced apart at approximately 60 millimeters (mm), which is the average interocular distance of human eyes. Therefore, a modular wedge that captures video from lenses at that separation distance can mimic the parallax experienced by typical human vision. In various examples, the modular wedges can be assembled to have different lens separation distances, depending on the application.

At block 504, a pair of transceivers communicatively coupled to the pair of imaging sensors of the modular wedges are formed. For example, the transceivers may be coupled to the imaging sensors via an image processing circuitry. In various examples, a panoramic video generator may also be displaced into the housing.

At block 506, a housing with connections for the transceivers of the modular wedges is formed. For example, the housing may have connections for the transceivers for a variety of modular wedge configurations. In some examples, optical transceivers may be used for fiber optic transmission. For example, multiplexers to combine the video signals from different modules so that instead of N fiber lines for an assembly of N modular wedges, only one fiber line may be used.

At block 508, the modular wedges are displaced into a housing to form a modular wedge array. For example, the modular wedges may be displaced into the housing in a circular pattern. In some examples, the wedges may be the modular wedge 100 of FIG. 1 or the foveated video capture wedge of FIGS. 3A-3C.

At block 510, the lenses are replaced with lenses having different parameters based on an application of the modular wedge array. For example, the replacement lenses may have a different focal length. As one example, given a 35 mm sensor, the focal length may be a wide angle focal length of 35 mm or less. In some examples, the focal length may be a standard focal length of 35-70 mm, or a telephoto focal length of greater than 70 mm. In some examples, the replacement lenses may have a different speed or maximum aperture. For example, lenses with higher speed or greater maximum aperture may be provide more light to enable faster frame rates.

At block 512, modular wedges are added to or removed from the housing. For example, a modular wedge may be removed from the housing to reduce the size of a transmitted panoramic video. In some examples, a modular wedge may be added to increase the quality of a transmitted panoramic video or an angle of the panoramic video.

This process flow diagram is not intended to indicate that the blocks of the example process 500 are to be executed in any particular order, or that all of the blocks are to be included in every case. Further, any number of additional blocks not shown may be included within the example process 500, depending on the details of the specific implementation.

Figure 6:
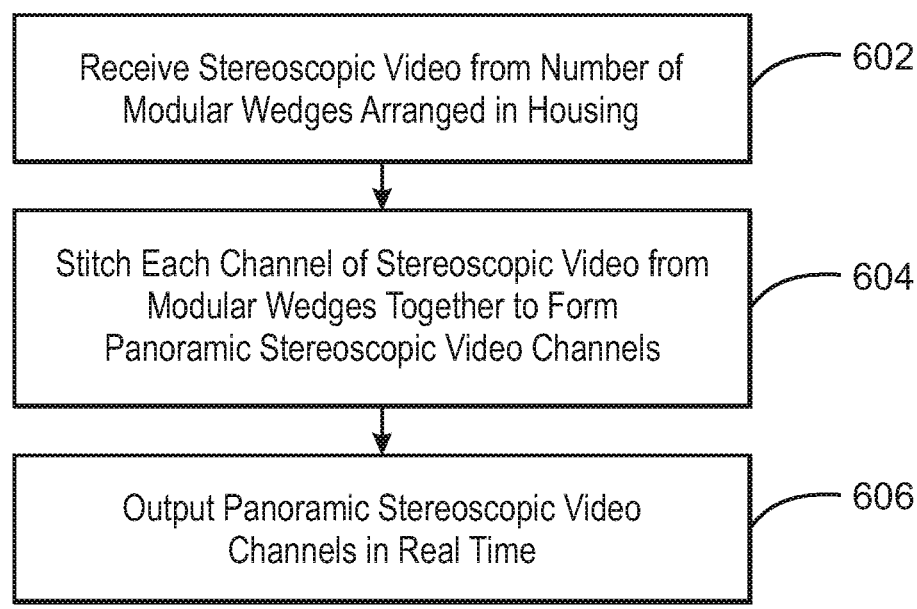
FIG. 6 is a flow chart illustrating a method for generating panoramic video using modular wedges.

FIG. 6 is a flow chart illustrating a method for generating panoramic video using modular wedges. The example method is generally referred to by the reference number 600 and can be implemented in the system 200 of FIG. 2, the computer device 700 of FIG. 7, or using the computer readable media 800 of FIG. 8.

At block 602, stereoscopic video is received from a number of modular wedges arranged in a housing. For example, the number of modular wedges used may be based on the angle of the lenses used in the modular wedges and the field of view to be captured.

At block 604, each channel of the stereoscopic video from the number of modular wedges is stitched together to form panoramic stereoscopic video channels. For example, video from each of the modular wedges may be warped and compared to smoothly join the multiple videos into one continuous panoramic video.

At block 606, the panoramic stereoscopic video channels are output in real time. For example, the panoramic stereoscopic video channels may be broadcast live for audiences. In various examples, users in the audience may then use virtual reality headsets to view particular portions of the panoramic stereoscopic video channels. The resulting experience may enable an improved viewing experience of a live event as the live event is occurring.

This process flow diagram is not intended to indicate that the blocks of the example process 600 are to be executed in any particular order, or that all of the blocks are to be included in every case. Further, any number of additional blocks not shown may be included within the example process 600, depending on the details of the specific implementation.

Figure 7:
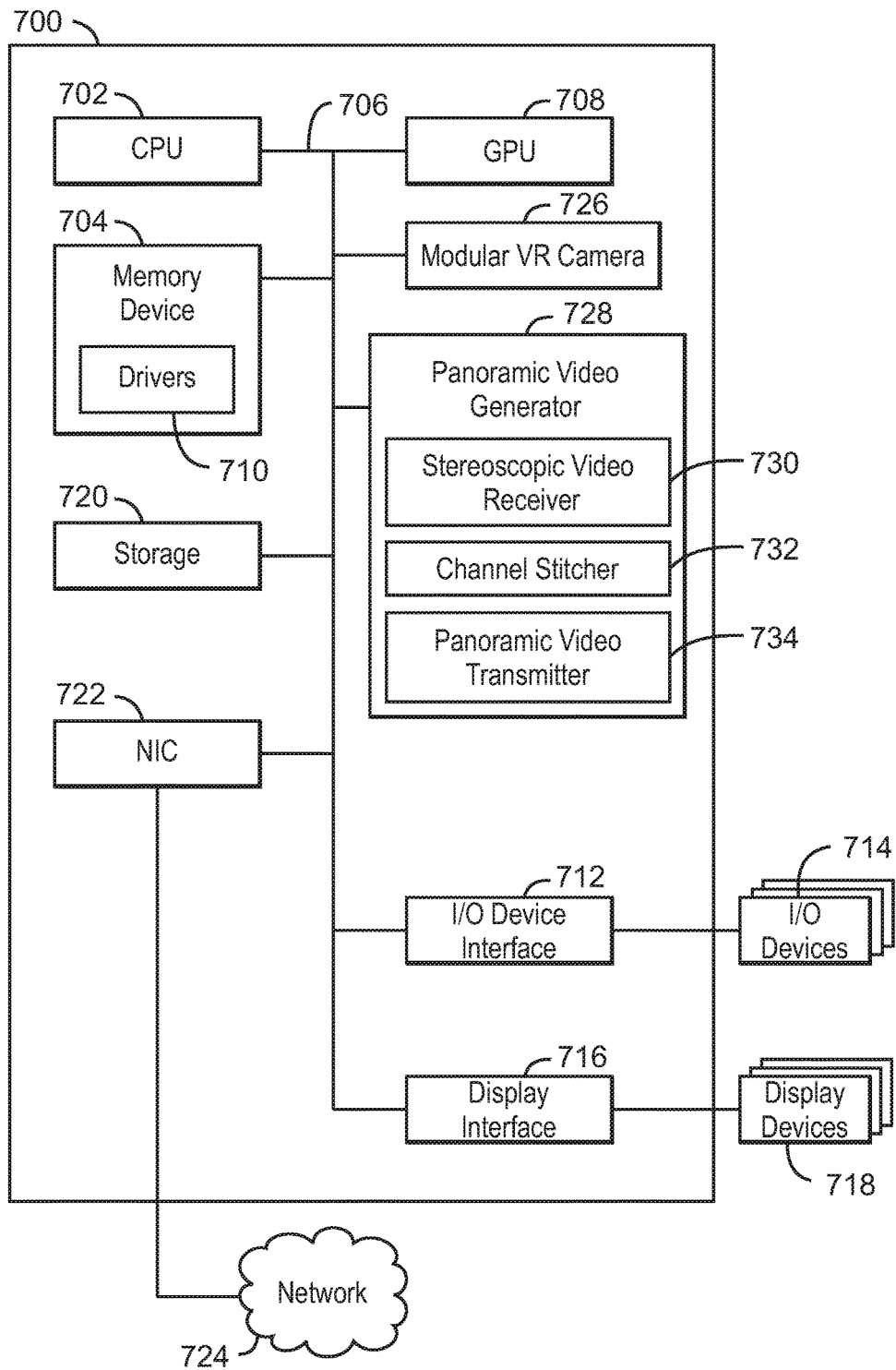
FIG. 7 is block diagram illustrating an example computing device that can generate panoramic video using modular wedges.

Referring now to FIG. 7, a block diagram is shown illustrating an example computing device that can generate panoramic video using modular wedges. The computing device 700 may be, for example, a laptop computer, desktop computer, tablet computer, mobile device, or wearable device, among others. In some examples, the computing device 700 may be a panoramic video imaging device. The computing device 700 may include a central processing unit (CPU) 702 that is configured to execute stored instructions, as well as a memory device 704 that stores instructions that are executable by the CPU 702. The CPU 702 may be coupled to the memory device 704 by a bus 706. Additionally, the CPU 702 can be a single core processor, a multi-core processor, a computing cluster, or any number of other configurations. Furthermore, the computing device 700 may include more than one CPU 702. In some examples, the CPU 702 may be a system-on-chip (SoC) with a multi-core processor architecture. In some examples, the CPU 702 can be a specialized digital signal processor (DSP) used for image processing. The memory device 704 can include random access memory (RAM), read only memory (ROM), flash memory, or any other suitable memory systems. For example, the memory device 704 may include dynamic random access memory (DRAM).

The memory device 704 can include random access memory (RAM), read only memory (ROM), flash memory, or any other suitable memory systems. For example, the memory device 704 may include dynamic random access memory (DRAM).

The computing device 700 may also include a graphics processing unit (GPU) 708. As shown, the CPU 702 may be coupled through the bus 706 to the GPU 708. The GPU 708 may be configured to perform any number of graphics operations within the computing device 700. For example, the GPU 708 may be configured to render or manipulate graphics images, graphics frames, videos, or the like, to be displayed to a user of the computing device 700.

The memory device 704 can include random access memory (RAM), read only memory (ROM), flash memory, or any other suitable memory systems. For example, the memory device 704 may include dynamic random access memory (DRAM). The memory device 704 may include device drivers 710 that are configured to execute the instructions for generating panoramic video. The device drivers 710 may be software, an application program, application code, or the like.

The CPU 702 may also be connected through the bus 706 to an input/output (I/O) device interface 712 configured to connect the computing device 700 to one or more I/O devices 714. The I/O devices 714 may include, for example, a keyboard and a pointing device, wherein the pointing device may include a touchpad or a touchscreen, among others. The I/O devices 714 may be built-in components of the computing device 700, or may be devices that are externally connected to the computing device 700. In some examples, the memory 704 may be communicatively coupled to I/O devices 714 through direct memory access (DMA).

The CPU 702 may also be linked through the bus 706 to a display interface 716 configured to connect the computing device 700 to a display device 718. The display device 718 may include a display screen that is a built-in component of the computing device 700. The display device 718 may also include a computer monitor, television, or projector, among others, that is internal to or externally connected to the computing device 700.

The computing device 700 also includes a storage device 720. The storage device 720 is a physical memory such as a hard drive, an optical drive, a thumbdrive, an array of drives, a solid-state drive, or any combinations thereof. The storage device 720 may also include remote storage drives.

The computing device 700 may also include a network interface controller (NIC) 722. The NIC 722 may be configured to connect the computing device 700 through the bus 707 to a network 724. The network 724 may be a wide area network (WAN), local area network (LAN), or the Internet, among others. In some examples, the device may communicate with other devices through a wireless technology. For example, the device may communicate with other devices via a wireless local area network connection. In some examples, the device may connect and communicate with other devices via Bluetooth® or similar technology.

The computing device 700 further includes a modular virtual reality (VR) camera 726. For example, the modular VR camera may include one or more modular wedges having two lenses each. In some examples, the modular VR camera 726 may capture stereoscopic video. For example, the lenses may be spaced at about 60 millimeters. In various examples, the modular virtual reality (VR) camera 726 may include one or more foveated video capture wedges, such as the foveated video capture wedge described in FIGS. 3A-3C.

The computing device 700 further includes a panoramic video generator 728. For example, the panoramic video generator 728 can be used to generate panoramic video. The panoramic video generator 728 can include a stereoscopic video receiver 730, a channel stitcher 732, and a panoramic video transmitter 734. In some examples, each of the components 730-734 of the panoramic video generator 728 may be a microcontroller, embedded processor, or software module. The stereoscopic video receiver 730 can receive a stereoscopic video from a number of modular wedges arranged in a housing. In some examples, the number of modular wedges may be 7 or more. In various examples, the number of modular wedges may be 10 or more. The channel stitcher 732 can stich each channel of the stereoscopic video from the plurality of modular wedges together to form panoramic stereoscopic video channels. In some examples, the channel stitcher 732 can automatically generate 180 degree panoramic video channels in response to detecting stereoscopic video from at least five modular wedges. In some examples, the channel stitcher 732 can automatically generate 360 panoramic video channels in response to detecting stereoscopic video from at least ten modular wedges. The panoramic video transmitter 734 can output the panoramic stereoscopic video channels in real time. For example, the panoramic video transmitter 734 can output panoramic video channels at a rate of at least 60 frames per second. In various examples, the panoramic video may be output in an uncompressed or a compressed format.

The block diagram of FIG. 7 is not intended to indicate that the computing device 700 is to include all of the components shown in FIG. 7. Rather, the computing device 700 can include fewer or additional components not illustrated in FIG. 7, such as additional buffers, additional processors, and the like. The computing device 700 may include any number of additional components not shown in FIG. 7, depending on the details of the specific implementation. Furthermore, any of the functionalities of the stereoscopic video receiver 730, the channel stitcher 732, or the panoramic video transmitter 734, may be partially, or entirely, implemented in hardware and/or in the processor 702. For example, the functionality may be implemented with an application specific integrated circuit, in logic implemented in the processor 702, or in any other device. In addition, any of the functionalities of the CPU 702 may be partially, or entirely, implemented in hardware and/or in a processor. For example, the functionality of the panoramic video generator 728 may be implemented with an application specific integrated circuit, in logic implemented in a processor, in logic implemented in a specialized graphics processing unit such as the GPU 708, or in any other device.

Figure 8:
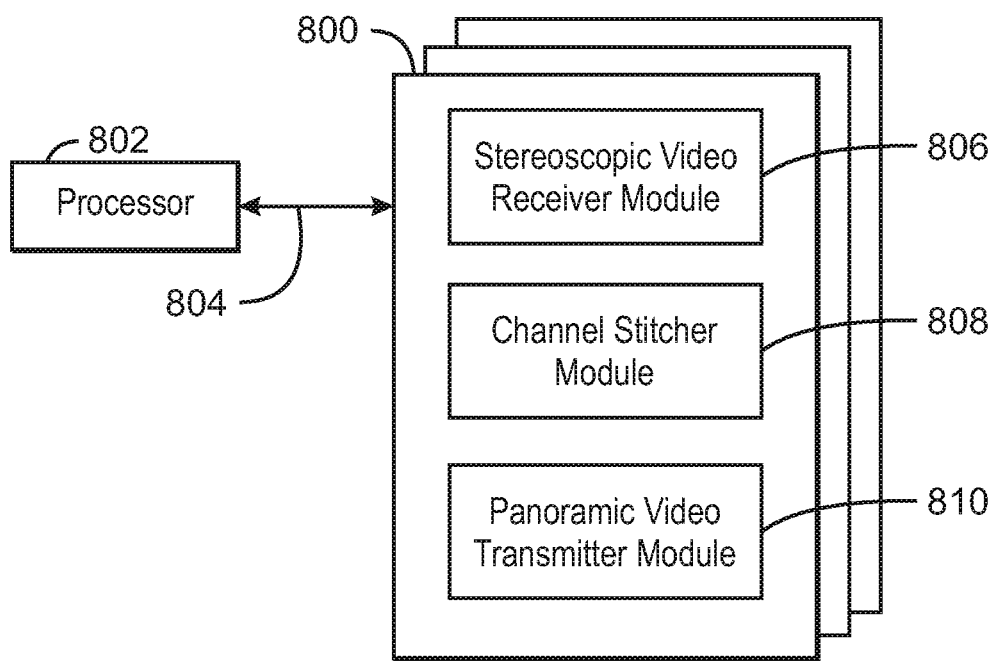
FIG. 8 is a block diagram showing computer readable media that store code for generating panoramic video using modular wedges.

FIG. 8 is a block diagram showing computer readable media 800 that store code for generating panoramic video using modular wedges. The computer readable media 800 may be accessed by a processor 802 over a computer bus 804. Furthermore, the computer readable medium 800 may include code configured to direct the processor 802 to perform the methods described herein. In some embodiments, the computer readable media 800 may be non-transitory computer readable media. In some examples, the computer readable media 800 may be storage media.

The various software components discussed herein may be stored on one or more computer readable media 800, as indicated in FIG. 8. For example, a stereoscopic video receiver module 806 may be configured to receive stereoscopic video from a plurality of modular wedges arranged in a housing. A channel stitcher module 808 may be configured to stich each channel of the stereoscopic video from the plurality of modular wedges together to form panoramic stereoscopic video channels. In some examples, the channel stitcher module 808 may be configured to automatically generate 180 degree panoramic video channels in response to detecting stereoscopic video from at least five modular wedges. In some examples, the channel stitcher module 808 may be configured to automatically generate 360 panoramic video channels in response to detecting stereoscopic video from at least ten modular wedges. A panoramic video transmitter module 810 may be configured to output the panoramic stereoscopic video channels in real time. For example, the panoramic video transmitter 810 may be configured to output the panoramic video channels at a rate of at least 60 frames per second. For example, the panoramic video transmitter 810 may be configured to output the panoramic video channels at a bandwidth of up to 25 gigabytes per second.

The block diagram of FIG. 8 is not intended to indicate that the computer readable media 800 is to include all of the components shown in FIG. 8. Further, the computer readable media 800 may include any number of additional components not shown in FIG. 8, depending on the details of the specific implementation.

EXAMPLES

Example 1 is an apparatus for generating panoramic video. The apparatus includes a plurality of modular wedges, each modular wedge including: two high resolution imaging sensors. The apparatus also includes two lenses coupled to one side of the modular wedge. The apparatus further includes two transmitters coupled to the imaging sensors to output stereoscopic video.

Example 2 includes the apparatus of example 1, including or excluding optional features. In this example, the two discrete lenses are spaced apart by approximately 60 millimeters from the center of each of the two lenses.

Example 3 includes the apparatus of any one of examples 1 to 2, including or excluding optional features. In this example, the system includes five or more modular wedges to cover a field of view of greater than 180 degrees.

Example 4 includes the apparatus of any one of examples 1 to 3, including or excluding optional features. In this example, system includes four or less modular wedges.

Example 5 includes the apparatus of any one of examples 1 to 4, including or excluding optional features. In this example, the plurality of modular wedges is arranged into an array of 10 or more lenses that covers a 360 degree field of view.

Example 6 includes the apparatus of any one of examples 1 to 5, including or excluding optional features. In this example, the plurality of modular wedges is interchangeable.

Example 7 includes the apparatus of any one of examples 1 to 6, including or excluding optional features. In this example, the plurality of modular wedges includes a stack of different lenses.

Example 8 includes the apparatus of any one of examples 1 to 7, including or excluding optional features. In this example, the apparatus includes a panoramic video generator to receive the stereoscopic video from the plurality of modular wedges and generate a panoramic video based on the stereoscopic video.

Example 9 includes the apparatus of any one of examples 1 to 8, including or excluding optional features. In this example, the apparatus includes a fan to displace heat from the plurality of modular wedges out of the apparatus.

Example 10 includes the apparatus of any one of examples 1 to 9, including or excluding optional features. In this example, the apparatus includes a fan controller to control a fan based on temperature to reduce noise.

Example 11 is a method of forming a modular wedge array. The method includes forming a pair of imaging sensors to be optically coupled to a pair of lenses in a plurality of modular wedges. The method also includes forming a pair of transceivers communicatively coupled to the pair of imaging sensors of the plurality of modular wedges. The method further includes forming a housing with connections for the transceivers of the plurality of modular wedges. The method includes displacing the plurality of modular wedges into a housing to form the modular wedge array.

Example 12 includes the method of example 11, including or excluding optional features. In this example, the method includes replacing the pair of lenses with lenses having different focal lengths based on an application of the modular wedge array.

Example 13 includes the method of any one of examples 11 to 12, including or excluding optional features. In this example, the method includes adding a modular wedge to the housing.

Example 14 includes the method of any one of examples 11 to 13, including or excluding optional features. In this example, the method includes removing a modular wedge from the housing.

Example 15 includes the method of any one of examples 11 to 14, including or excluding optional features. In this example, forming the housing includes displacing a panoramic video generator into the housing.

Example 16 includes the method of any one of examples 11 to 15, including or excluding optional features. In this example, a number of the plurality of modular wedges is based on an angle of the lenses and a target field of view for the modular wedge array.

Example 17 includes the method of any one of examples 11 to 16, including or excluding optional features. In this example, forming the plurality of modular wedges includes including a fan in each of the modular wedges.

Example 18 includes the method of any one of examples 11 to 17, including or excluding optional features. In this example, the housing includes a fan to displace heat from the modular wedge array.

Example 19 includes the method of any one of examples 11 to 18, including or excluding optional features. In this example, the pair of imaging sensors and the pair of lenses are spaced apart at approximately 60 millimeters.

Example 20 includes the method of any one of examples 11 to 19, including or excluding optional features. In this example, the housing includes an optical transceiver for fiber optic transmission of panoramic video.

Example 21 is at least one computer readable medium for generating panoramic video having instructions stored therein that direct the processor to receive a stereoscopic video from a plurality of modular wedges arranged in a housing. The computer-readable medium also includes instructions that direct the processor to stich each channel of the stereoscopic video from the plurality of modular wedges together to form panoramic stereoscopic video channels. The computer-readable medium further includes instructions that direct the processor to output the panoramic stereoscopic video channels in real time.

Example 22 includes the computer-readable medium of example 21, including or excluding optional features. In this example, the computer-readable medium includes instructions to automatically generate 180 degree panoramic video channels in response to detecting the stereoscopic video from at least five modular wedges.

Example 23 includes the computer-readable medium of any one of examples 21 to 22, including or excluding optional features. In this example, the computer-readable medium includes instructions to automatically generate 360 panoramic video channels in response to detecting the stereoscopic video from at least ten modular wedges.

Example 24 includes the computer-readable medium of any one of examples 21 to 23, including or excluding optional features. In this example, the computer-readable medium includes instructions to output the panoramic video channels at a rate of at least 60 frames per second.

Example 25 includes the computer-readable medium of any one of examples 21 to 24, including or excluding optional features. In this example, the computer-readable medium includes instructions to output the panoramic video channels at a bandwidth of up to 25 gigabytes per second.

Example 26 includes the computer-readable medium of any one of examples 21 to 25, including or excluding optional features. In this example, the computer-readable medium includes instructions to output the panoramic video channels in an uncompressed format.

Example 27 includes the computer-readable medium of any one of examples 21 to 26, including or excluding optional features. In this example, the computer-readable medium includes instructions to output the panoramic video channels in a compressed format.

Example 28 includes the computer-readable medium of any one of examples 21 to 27, including or excluding optional features. In this example, the computer-readable medium includes instructions to detect the number of modular wedges.

Example 29 includes the computer-readable medium of any one of examples 21 to 28, including or excluding optional features. In this example, the computer-readable medium includes instructions to generate a panoramic video with a field of view based on the number of modular wedges and a detected angle of the lenses.

Example 30 includes the computer-readable medium of any one of examples 21 to 29, including or excluding optional features. In this example, the computer-readable medium includes instructions to control a fan based on a temperature in the housing.

Example 31 is a system for generating panoramic video. The system includes a plurality of modular wedges. Each of the modular wedges includes two high resolution imaging sensors. Each modular wedge also includes two lenses coupled to one side of the modular wedge. Each modular wedge further includes two transmitters coupled to the imaging sensors to output stereoscopic video.

Example 32 includes the system of example 31, including or excluding optional features. In this example, the two discrete lenses are spaced apart by approximately 60 millimeters from the center of each of the two lenses.

Example 33 includes the system of any one of examples 31 to 32, including or excluding optional features. In this example, the plurality of modular wedges includes five or more modular wedges to cover a field of view of greater than 180 degrees.

Example 34 includes the system of any one of examples 31 to 33, including or excluding optional features. In this example, the plurality of modular wedges includes four or less modular wedges.

Example 35 includes the system of any one of examples 31 to 34, including or excluding optional features. In this example, the plurality of modular wedges is arranged into an array of 10 or more lenses that covers a 360 degree field of view.

Example 36 includes the system of any one of examples 31 to 35, including or excluding optional features. In this example, the plurality of modular wedges is interchangeable.

Example 37 includes the system of any one of examples 31 to 36, including or excluding optional features. In this example, the plurality of modular wedges includes a stack of different lenses.

Example 38 includes the system of any one of examples 31 to 37, including or excluding optional features. In this example, the system includes a panoramic video generator to receive the stereoscopic video from the plurality of modular wedges and generate a panoramic video based on the stereoscopic video.

Example 39 includes the system of any one of examples 31 to 38, including or excluding optional features. In this example, the system includes a fan to displace heat from the plurality of modular wedges out of the system.

Example 40 includes the system of any one of examples 31 to 39, including or excluding optional features. In this example, the system includes a fan controller to control a fan based on temperature to reduce noise.

Example 41 is a system for generating panoramic video. The system includes a plurality of means for organizing capture of stereoscopic video. Each of the means for organizing capture of stereoscopic video includes a pair of means for capturing light. Each of the means for organizing capture of stereoscopic video also includes a pair of means for focusing the captured light. Each of the means for organizing capture of stereoscopic video further includes means for outputting stereoscopic video.

Example 42 includes the system of example 41, including or excluding optional features. In this example, the means for focusing the captured light are spaced apart by approximately 60 millimeters from the center of each of the two lenses.

Example 43 includes the system of any one of examples 41 to 42, including or excluding optional features. In this example, the plurality of means for organizing capture of stereoscopic video includes five or more modular wedges to cover a field of view of greater than 180 degrees.

Example 44 includes the system of any one of examples 41 to 43, including or excluding optional features. In this example, the plurality of means for organizing capture of stereoscopic video includes four or less modular wedges.

Example 45 includes the system of any one of examples 41 to 44, including or excluding optional features. In this example, the plurality of means for organizing capture of stereoscopic video is arranged into an array of 10 or more lenses that covers a 360 degree field of view.

Example 46 includes the system of any one of examples 41 to 45, including or excluding optional features. In this example, the plurality of means for organizing capture of stereoscopic video is interchangeable.

Example 47 includes the system of any one of examples 41 to 46, including or excluding optional features. In this example, the plurality of means for organizing capture of stereoscopic video includes a stack of different lenses.

Example 48 includes the system of any one of examples 41 to 47, including or excluding optional features. In this example, the system includes a panoramic video generator to receive the stereoscopic video from the plurality of means for organizing capture of stereoscopic video and generate a panoramic video based on the stereoscopic video.

Example 49 includes the system of any one of examples 41 to 48, including or excluding optional features. In this example, the system includes means for displacing heat from the plurality of means for organizing capture of stereoscopic video out of the system.

Example 50 includes the system of any one of examples 41 to 49, including or excluding optional features. In this example, the system includes means for controlling a fan based on temperature to reduce noise.

Not all components, features, structures, characteristics, etc. described and illustrated herein need be included in a particular aspect or aspects. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some aspects have been described in reference to particular implementations, other implementations are possible according to some aspects.

Additionally, the arrangement and/or order of circuit elements or other features illustrated in the drawings and/or described herein need not be arranged in the particular way illustrated and described. Many other arrangements are possible according to some aspects.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more aspects. For instance, all optional features of the computing device described above may also be implemented with respect to either of the methods or the computer-readable medium described herein. Furthermore, although flow diagrams and/or state diagrams may have been used herein to describe aspects, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. An apparatus for generating panoramic video, the apparatus comprising:
   a plurality of modular wedges, each modular wedge including:
   a support structure including a front side, a back side, a first lateral side extending between the front side and the back side, and a second lateral side opposite the first lateral side, the second lateral side extending between the front side and the back side, the front side larger than the back side, the first lateral side of a first one of the modular wedges to face the second lateral side of a second one of the modular wedges when the first and second ones of the modular wedges are mounted adjacent one another;
   two imaging sensors carried by the support structure;
   two telephoto lenses to be removably coupled to the front side of the support structure;
   a wide angle lens to be removably coupled to the front side of the support structure; and
   a transmitter mounted on the back side of the support structure and communicatively coupled to the imaging sensors to output foveated stereoscopic video.

2. The apparatus of claim 1, wherein the two telephoto lenses are spaced apart by approximately 60 millimeters from a center of each of the two telephoto lenses.

3. The apparatus of claim 1, wherein the plurality of modular wedges is to be arranged to cover a field of view of greater than 180 degrees.

4. The apparatus of claim 1, wherein the plurality of modular wedges includes four or less modular wedges.

5. The apparatus of claim 1, wherein the plurality of modular wedges is to be arranged into an array that covers a 360 degree field of view.

6. The apparatus of claim 1, wherein ones of the plurality of modular wedges are interchangeable.

7. The apparatus of claim 1, wherein ones of the plurality of modular wedges include a stack of different lenses, the stack including the two telephoto lenses arranged side by side in a first direction, the stack further including two additional lenses arranged adjacent corresponding ones of the two telephoto lenses in a second direction transverse to the first direction.

8. The apparatus of claim 1, including a panoramic video generator to receive the foveated stereoscopic video from the plurality of modular wedges and generate a panoramic video based on the foveated stereoscopic video.

9. The apparatus of claim 1, including a fan to displace heat from the plurality of modular wedges out of the apparatus.

10. The apparatus of claim 1, including a fan controller to control a fan based on temperature to reduce noise.

11. The apparatus of claim 1, wherein the two telephoto lenses include a first telephoto lens and a second telephoto lens, the apparatus further including a third telephoto lens and a fourth telephoto lens to be removable coupled to the front side of the support structure.

12. The apparatus of claim 11, wherein the first telephoto lens, the second telephoto lens, the third telephoto lens, and the fourth telephoto lens are positioned in a quadrilateral shape and the wide angle lens is positioned within the quadrilateral shape.

13. The apparatus of claim 12, wherein the first telephoto lens, the second telephoto lens, the third telephoto lens, and the fourth telephoto lens are angled away from the wide angle lens.

14. The apparatus of claim 1, wherein a first one of the two telephoto lenses is angled away from a second one of the two telephoto lenses.

15. The apparatus of claim 1, wherein the two telephoto lenses and the wide angled lens protrude outward from the front side of the support structure and away from the back side of the support structure.

16. A method of forming a modular wedge array, the method comprising:
   positioning five imaging sensors in each one of a plurality of support structures corresponding to a plurality of modular wedges, each of the support structures including a front side, a back side, a first lateral side extending between the front side and the back side, and a second lateral side extending between the front side and the back side, the front side larger than the back side, the five imaging sensors to be optically coupled to two pairs of telephoto lenses and a wide angle lens removably coupled to the front side of corresponding ones of the plurality of support structures;
   positioning a pair of transceivers on the back side of each of the plurality of support structures, the pair of transceivers communicatively coupled to the imaging sensors in the corresponding support structure; and
   positioning the plurality of modular wedges into a housing to form the modular wedge array, the housing including connections for the transceivers on the plurality of support structures of the plurality of modular wedges, the first lateral side of a first one of the modular wedges to face the second lateral side of a second one of the modular wedges when the first and second ones of the modular wedges are positioned adjacent one another in the housing.

17. The method of claim 16, including replacing at least one of the two pairs of telephoto lenses with lenses having different focal lengths based on an application of the modular wedge array.

18. The method of claim 16, including adding a modular wedge to the housing.

19. The method of claim 16, including removing a modular wedge from the housing.

20. The method of claim 16, including positioning a panoramic video generator into the housing.

21. At least one computer readable storage device comprising instructions stored therein that, in response to being executed on a computing device, cause the computing device to:
  obtain a stereoscopic video from a plurality of imaging sensors within corresponding ones of a plurality of support structures of corresponding ones of a plurality of modular wedges, each of the support structures including a front side, a back side, a first lateral side extending between the front side and the back side, and a second lateral side extending between the front side and the back side, the front side larger than the back side, the first lateral side of a first one of the modular wedges to face the second lateral side of a second one of the modular wedges when the first and second ones of the modular wedges are mounted adjacent one another, each modular wedge including two pairs of selectively removable telephoto lenses and a wide angle lens, the stereoscopic video including multiple channels;
  align higher resolution images from the two pairs of telephoto lenses with a lower resolution background image from the wide angle lens, the lower resolution background image representing a first area of a scene, different ones of the higher resolution images representing different portions of the first area, a combined area of all of the different portions being smaller than an entirety of the first area;
  stitch each of the channels of the stereoscopic video from the plurality of imaging sensors together to form panoramic stereoscopic video channels; and
  output the panoramic stereoscopic video channels in real time, wherein a higher resolution image is used to view a portion of the background image displayed in an output foveated stereoscopic video.

22. The at least one computer readable storage device of claim 21, wherein the instructions cause the computing device to automatically generate 180 degree panoramic video channels in response to detecting the foveated stereoscopic video from the imaging sensors associated with at least five modular wedges.

23. The at least one computer readable storage device of claim 21, wherein the instructions cause the computing device to automatically generate 360 panoramic video channels in response to detecting the foveated stereoscopic video from the imaging sensors associated with at least ten modular wedges.

24. The at least one computer readable storage device of claim 21, wherein the instructions cause the computing device to output the panoramic stereoscopic video channels at a rate of at least 60 frames per second.

25. The at least one computer readable storage device of claim 21, wherein the instructions cause the computing device to output the panoramic stereoscopic video channels at a bandwidth of up to 25 gigabytes per second.

* * * * *